United States Patent [19]
Richter et al.

[11] 4,362,183
[45] Dec. 7, 1982

[54] SPRING LOADED SAFETY VALVE

[75] Inventors: Herbert Richter, Weinheim; Karl Schaaf, Mannheim, both of Fed. Rep. of Germany

[73] Assignee: Bopp & Reuther GmbH, Mannheim, Fed. Rep. of Germany

[21] Appl. No.: 162,397

[22] Filed: Jun. 23, 1980

[30] Foreign Application Priority Data
Jun. 30, 1979 [DE] Fed. Rep. of Germany ....... 2926522

[51] Int. Cl.³ ............................................. F16K 17/06
[52] U.S. Cl. .................... 137/489; 92/13.5; 137/492.5; 251/63.4
[58] Field of Search ..................... 137/485, 489, 492.5; 251/63.4; 92/13.5

[56] References Cited
U.S. PATENT DOCUMENTS
3,512,549  5/1970  Wiegand .......................... 137/489
3,865,132  2/1975  Wiegand .......................... 137/489 X Primary Examiner—Robert G. Nilson
Attorney, Agent, or Firm—Michael J. Striker

[57] ABSTRACT

A spring loaded safety valve includes a control device which admits the pressurized medium to a supplemental loading system which consists of a spring housing which serves as a cylinder for a spring retainer which serves as a supplemental loading piston that is arranged about two adjustable sleeves which are arranged around the valve stem and which control the response pressure and the supplemental loading of the valve spring.

9 Claims, 1 Drawing Figure

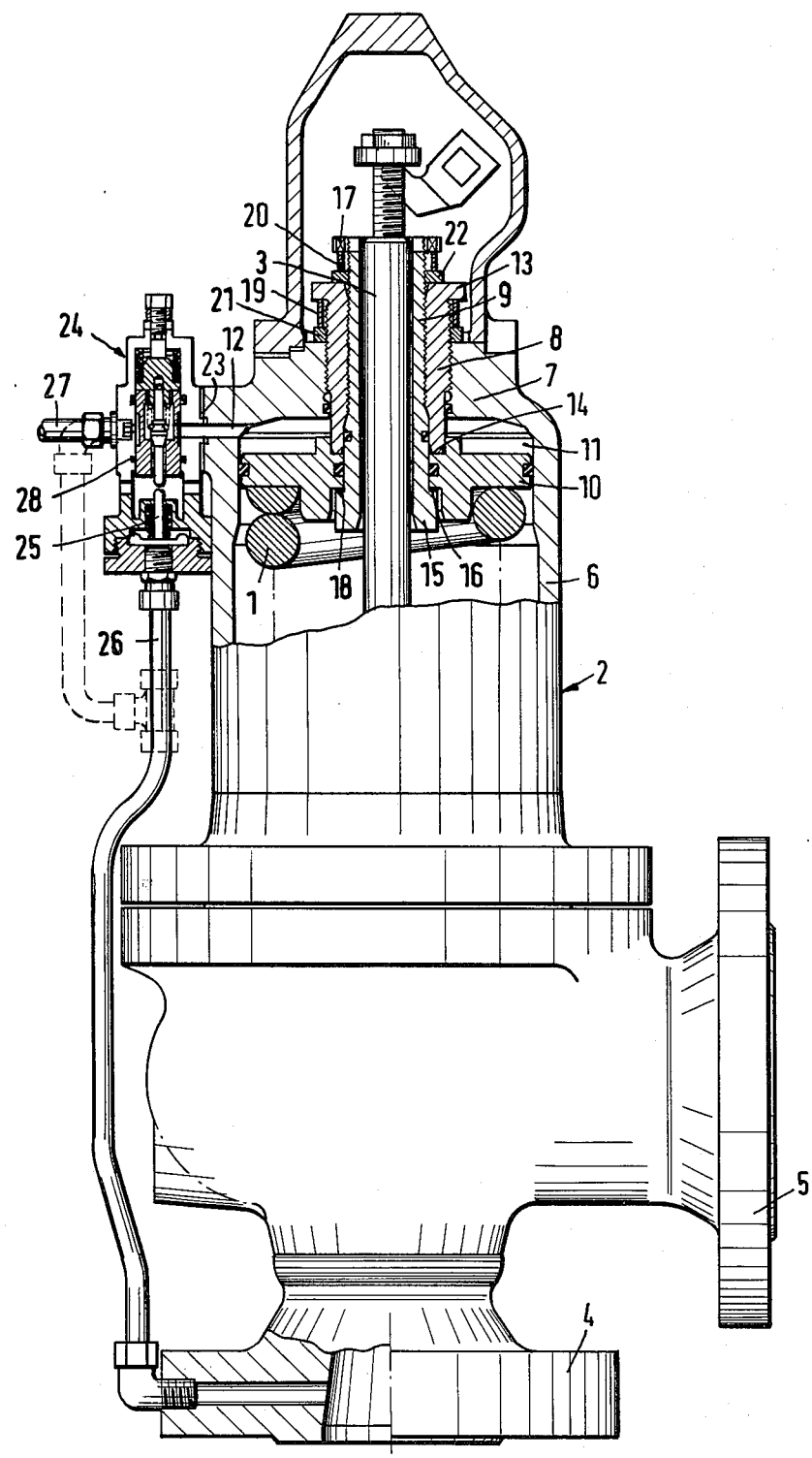

SPRING LOADED SAFETY VALVE

BACKGROUND OF THE INVENTION

The present invention relates to spring loaded safety valves, and particularly, to springloaded safety valves of medium or small dimensions in which the closing force is directly increased by the action of a supplemental loading piston upon the valve spring in the valve closing position, due to a pressure control device which releases the pressure shortly before the response pressure is attained.

Spring loaded safety valves are well known which have pneumatic cylinders arranged above the spring housing that operate in conjunction with a piston that is attached to the end of the valve shaft so that each motion of the piston into either a valve opening or closing position is transmitted by way of the valve shaft to a valve shutting part, To control the loading such supplementally loaded safety valve have, according to technical safety rules, at the very least, three separate control means, namely, three impulse transmitters and three control members each equipped with an independent pressure outlet pipe, impulse control and regulating pipe, in order that the supplemental force safely yields when trouble occurs with one of the control means. In one such valve the magnitude of the supplemental loading is dependent upon, and not upwardly limited by, the pressure of the control medium and the supplemental piston surface. Apart from this the valve is structured with the pressure sensing element and a diagram valve acting with the affixed loading cylinder and the three independent control means.

There are also known safety valves with affixed supplementally loading cylinders whose pistons do not directly act upon the valve stem, but rather communicate with the valve stem by way of the valve spring acting upon the valve plug supporting the valve stem. In that case the heaving stroke of the supplemental loading piston is limited by the cylinder so that the supplemental force is no more than 1.2 times the response force, thus, if a disruption occurs in the region in which the supplemental force turns off, the valve plug opens before exceeding the allowed loading. Also in this limited closing force safety valve, according to technical safety rules, there must be at least two separate pressure sensing elements and control valves, so that such safety valves, particularly ones of medium and small dimensions equipped with supplemental loading cylinders, are too bulky. Additionally, in the known safety valves, the magnitude of the supplemental loading cannot be changed on account of the fixed heaving stroke of the piston, as is also true of the manufacturing tolerance, and the adjustment of the valve spring.

SUMMARY OF THE INVENTION

It is the purpose of the invention, a spring loaded safety valve, particularly of medium and small dimensions, to provide, by simple means, an increase in the supplemental loading force exerted upon the valve plug when closing. It is another purpose of the invention to overcome the difficulties presented in the prior art.

The solution of these problems will be seen in the following examination of the invention.

By limiting the additional initial stress in the valve spring to about 105% of the response force only a single control means is needed, since the safety valve will still open in the event of a disruption of the control means when the pressure increases to 10% above the response pressure, thereby making the present complete safety valve essentially simpler than known valves with supplemental loading. This supplemental initial spring stressing also suffices to tightly press the valve plug against the valve seat by setting in operation a force which is increased until in the range of the response force. Since the upper retainer of the valve spring forms the supplemental loading piston, and the spring housing, in the region of the upper spring retainer, serves as a loading cylinder with a connecting bore hole for the supply and discharge of the pressure medium, the safety valve, according to the invention, occupies scarcely more room than a traditional valve without supplemental loading, and the construction is essentially simpler than the known safety valves with supplemental loading.

Through the top of the spring housing are mounted two regulating adjustable sleeves that fit onto each other and permit the fine adjustment of both the response pressure of the safety valve and the amount of the supplemental loading. On the one hand safety is assured by the fact that the safety valve opens precisely upon reaching 100% of the response pressure, and on the other hand by limiting the supplemental initial stressing of the valve spring due to the supplemental loading to exactly 105% of the response pressure, or on account of independent adjustment of the magnitude of the hearing stroke, whereby in each case a complete opening of the safety valve is produced within an allowable pressure rise of 10%.

Another aspect of the invention is placing the adjustable sleeves for the supplemental loading cylinder between stroke arresting stops so that the magnitude of the determinable action of the supplemental loading is kept constant through which the adjustment of the adjustable sleeves in relation to one another fixes the tolerance, so that a later setting of the valve spring or limited readjustment of the response pressure by the user, during the start of the valve's operation, which was adjusted in the manufacturing plant limiting the supplemental loading to 105%, becomes regulated and remains steady in its amount relative to the response pressure without the valve being employed until the valve of the supplemental loading becomes high.

A definite adjustment and a lasting support of both adjustable sleeves is guaranteed by the fact that both sleeves are formed as threaded sleeves resulting in yet another aspect of the invention.

An additional aspect of the invention is the use of double spacing means to secure the adjustable sleeves against alterations in their adjustment so that variations in the response pressure and the supplemental loading do not occur.

A further particular of the invention consists of sealing stopping collars employed as spacers, provided to and supported by the adjustable sleeves and the top of the spring housing, so that a simple blocking of the adjustable sleeves relative to each other and in relation to the top of the spring housing is produced.

Another characteristic of the invention is the use of a counter nut beneath the stopping collars to lock the adjustable sleeves in the desired position.

Yet another characteristic of the invention is a single control device. Only one such device is needed since the supplemental loading is limited to about 105% of the response pressure and thus only a device for controlling the supplemental loading is essential. This device is mounted on an eye located on the spring housing. The complete safety valve can be produced totally built in so that on the building site it can be placed near to the valve junction and fitted easily the pressure outlet for the pressure sensing element of the control device can be fastened tightly onto the inlet pipe of the safety valve so that a single unit structure for the safety valve is produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a longitudinal section of the safety valve with supplemental loading.

DESCRIPTION OF THE PREFERRED EMBODIMENT

Valve spring 1, loads safety valve 2 which is endowed with a valve stem 3. At the lower end of valve stem 3 (not shown) is a valve seat and valve plug which presses into the valve seat and closes the passage from inlet pipe 4 to outlet pipe 5. Valve spring 1 extends downward from spring housing 6, the top 7 of which is screwed onto concentric adjustable sleeves 8 and 9. Valve spring 1 braces itself against the spring retainer 10 which also acts as the supplemental loading piston. The upper part of spring housing 6 forms the supplemental loading cylinder 11, so that no additional structure is needed for the supplemental loading. Having access to the cylinder 11 is the coupling bore hole 12 which supplies and discharges the pressure medium.

Serving for the adjustment of the response pressure adjustable sleeve 8 has an adjusting collar 13 at its upper end and abutment 14 at its lower end. The spring retainer 10 which forms the loading piston presses against abutment 14 which limits its upward motion. The adjustable sleeve may be rotated to effect the desired adjustment. The adjustable sleeve 9 is positioned so that its outer surface is fitted against the inner surface of sleeve 8. Adjustable sleeve 9 serves to adjust the supplemental loading and extends beneath the loading piston 10 forming an annular projection 15 the upper edge of which forms abutment 16 which limits the supplemental initial stressing of valve spring 1 to 105% of the response pressure. The adjustment of adjustable sleeve 9 is effected via the collar 17.

The travel 18 of the loading piston 10 between the upper stroke stop 14 and the lower stroke stop 16 determines the magnitude of the supplemental loading. In the illustrated position the pressure medium is not entering into loading cylinder 11, so that the loading piston 10, due to the pressure of valve spring 1, is fitted against the stroke stop 14 of adjustable sleeve 8. By the admission of a pressure medium into the loading cylinder 11, the valve spring 1 becomes additionally compressed and the loading piston 10 moves until it is stopped and rests upon the lower stroke stop 16 of the adjustable sleeve 9.

The response pressure is adjusted by way of adjustable sleeve 8 and the supplemental loading by means of adjustable sleeve 9 in the manufacturing plant. These adjustments are protected by the sealed stopping collars 19 and 20 which function as spacers. The collar 19 of adjustable sleeve 8 is placed between collar 13 and the top 7 of spring housing 6 reinforced by counter nut 21. The stopping collar 20 of adjustable sleeve 9 is located between adjusting collar 17 and the upper end of collar 13 of adjustable sleeve 8, thereby reinforced by counter nut 22. To readjust the response pressure originally set at the manufacturing plant, positioning collar 19 is removed, counter nut 21 is loosened and the threaded sleeve 8 is turned, thereby downwardly displacing the spring retainer 10. In this readjustment adjustable sleeve 9 is carried along with the other sleeve 8 so that the travel 18 is maintained at its original factory set value thereby preserving the original value of supplemental loading. For safety, adjustable sleeve 9 is pulled by collar 17 until collar 20 or counter nut 17 securely abuts against collar 13 of sleeve 8.

Spring housing 6 is provided with an eye 23 onto which control device 24 is attached. The control device 24 possesses a pressure sensor 25 in which pressure outlet pipe 26 is tightly connected to the inlet pipe 4 of the safety valve. The pressure sensor 25 serves for opening of control valve 28. The pressure medium enters control device 24 through pipe 27, the ingress and egress of the pressure medium into and out of loading cylinder 11 occurs through the control valve 28 and the coupling bore hole 12. The pipe 27 is in open communication, via a narrow throttling point, with the loading cylinder 11 so that pressure is applied to the latter. The pressure is relieved during opening of the control valve 28, so that the pressure medium is discharged outwardly via a cross section which is greater than that of the throttling point. Thereby, the pressure in the cylinder 11 decreases and the piston 10 returns to its initial position.

With the control device 24, the pressure sensor is connected via the outlet pipe 26 with the inlet pipe 4. The diaphragm of the pressure sensor is loaded by the own pressure medium, and the pusher of the pressure sensor displaces the valve rod of the control valve 28 upwardly upon reaching the response pressure and thereby opens the control valve. The pipe 27 is connected with a not shown pressure medium source and supplies the pressure medium to the loading cylinder, as mentioned above. This is actually an additional pressure medium acting upon the loading piston 10. Instead of the supply of the additional medium from outside, the own pressure medium can be used to act upon the piston 10. In this case, the pipe 27 is dispensed with and a branching conduit shown in dashed lines is provided so that the own pressure medium flows via the outlet pipe 26 into the loading cylinder 11.

It will be understood that each of the elements described above, or two or more together, may also find a useful application in other types of valves differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A spring-loaded safety valve, particularly of small and medium dimensions, comprising a valve housing having an inlet port, an outlet port and an upper region functioning as an additional loading cylinder; a valve seat in said valve housing interposed between said ports; a valve member movable in said housing to and from a position in which it engages said valve seat; spring means permanently biasing said valve member towards said valve seat; single means arranged to superimpose upon the biasing force of said spring means an additional force acting upon said valve member in direction of said valve seat while said valve member is in engagement therewith, and to relieve said additional force first before the pressure in said valve reaches a predetermined valve-opening level, said single means comprising piston means engaging said spring means and movable within said additional loading cylinder so as to apply said additional force to said spring means; limiting means for limiting the travel of said piston means, said limiting means comprising an inner adjustable sleeve having an abutment limiting the additional loading of said spring means by said piston means by directly contacting said piston means, and an outer adjustable sleeve arranged concentrically about said inner sleeve and having an abutment limiting the travel of said piston means by directly contacting said piston means thereby limiting the lessening of the additional force and setting the predetermined valve-opening level; and relieving means to relieve said additional force just before the pressure in said valve reaches a predetermined valve-opening level.

2. A springloaded safety valve as defined in claim 1, wherein the additional force is limited to about 105% of the predetermined valve opening level.

3. A springloaded safety valve as defined in claim 1, further comprising a stopping collar which maintains said inner and outer adjustable sleeves in a constant relative position.

4. A springloaded safety valve as defined in claim 1, wherein said adjustable sleeves are formed as threaded sleeves.

5. A springloaded safety valve as defined in claim 1, further comprising safety means located between the upper region of said valve housing and said outer sleeve, operative for the adjustment of the predetermined valve-opening level.

6. A springloaded safety valve as defined in claim 1; further comprising a first adjusting collar permanently attached to the upper part of said inner sleeve; a second adjusting collar permanently attached to the upper region of said outer sleeve; a first stopping collar located between the upper region of said valve housing and said second adjusting collar, and a second stopping collar located between said first and second adjusting collars, thereby fixing the positions of said sleeves relative to said valve housing.

7. A springloaded safety valve as defined in claim 1, further comprising two threaded nuts, each placed beneath a stopping collar, serving as counter nuts for said sleeves.

8. A springloaded safety valve as defined in claim 1, wherein said valve housing has an upper region provided with a bore hole, said relieving means further comprising a control device which possesses a pressure sensor and is operative to admit a pressure medium into said additional loading cylinder by way of said bore hole when the valve is in a closed position and to release the pressure medium from said cylinder just prior to attainment of the predetermined pressure level.

9. A springloaded safety valve as defined in claim 8; further comprising a connection between said inlet port and said control device, so that the pressure medium controlled by the valve is used as the additional loading pressure medium.

* * * * *